(12) United States Patent
Choi et al.

(10) Patent No.: US 12,487,289 B2
(45) Date of Patent: Dec. 2, 2025

(54) SYSTEMS AND METHODS FOR DETERMINING THE CHARGEABLE OR DISCHARGEABLE ENERGY OF A BATTERY ENERGY STORAGE SYSTEM

(71) Applicant: LG ENERGY SOLUTION, LTD., Seoul (KR)

(72) Inventors: Wonbin Choi, Westborough, MA (US); Kiran Kumar, Westborough, MA (US)

(73) Assignee: LG ENERGY SOLUTION, LTD., Seoul (KR)

( * ) Notice: Subject to any disclaimer, the term of this patent is extended or adjusted under 35 U.S.C. 154(b) by 0 days.

(21) Appl. No.: 18/955,372

(22) Filed: Nov. 21, 2024

(65) Prior Publication Data
US 2025/0164563 A1    May 22, 2025

Related U.S. Application Data

(60) Provisional application No. 63/601,641, filed on Nov. 21, 2023.

(51) Int. Cl.
| | |
|---|---|
| *G01R 31/367* | (2019.01) |
| *G01R 31/36* | (2020.01) |
| *G01R 31/3842* | (2019.01) |
| *G01R 31/396* | (2019.01) |

(52) U.S. Cl.
CPC ....... *G01R 31/367* (2019.01); *G01R 31/3648* (2013.01); *G01R 31/3842* (2019.01); *G01R 31/396* (2019.01)

(58) Field of Classification Search
CPC .............. G01R 31/367; G01R 31/3648; G01R 31/3842; G01R 31/396
See application file for complete search history.

(56) References Cited

U.S. PATENT DOCUMENTS

| | | | |
|---|---|---|---|
| 11,691,518 B2 | 7/2023 | Holme | |
| 2020/0081070 A1 | 3/2020 | Chemali et al. | |
| 2023/0109031 A1* | 4/2023 | Murphy | G01R 31/3842 702/63 |

(Continued)

FOREIGN PATENT DOCUMENTS

| | | |
|---|---|---|
| CN | 110967638 A | 4/2020 |
| JP | 2023149292 A | 10/2023 |

(Continued)

*Primary Examiner* — Ricky Go
(74) *Attorney, Agent, or Firm* — Bryan Cave Leighton Paisner LLP

(57) ABSTRACT

Systems and methods for determining a total chargeable/dischargeable energy of a subsystem of a battery energy storage system (BESS) are disclosed. An iterative process is executed over a dynamic time period divided into iterations using a neural network model comprising an energy prediction sub-model and a state prediction sub-model. The energy prediction sub-model outputs a chargeable/dischargeable energy of the subsystem for the current iteration. The state prediction sub-model outputs a voltage of the subsystem for a next iteration, the charge rate of the subsystem for the next iteration, the maximum temperature of the subsystem for the next iteration, and a charge rate difference for the next iteration. A total chargeable/dischargeable energy of the BESS subsystem is determined by summing the dischargeable energies determined for each iteration.

18 Claims, 10 Drawing Sheets

(56) References Cited

U.S. PATENT DOCUMENTS

2024/0295610 A1\* 9/2024 Fleischer ............. G01R 31/367
2024/0345171 A1\* 10/2024 Matsuki ................ H01M 10/48

FOREIGN PATENT DOCUMENTS

| KR | 1020140062772 A | 5/2014 |
| KR | 10-2021-0116801 A | 9/2021 |
| KR | 10-2022-0112997 A | 8/2022 |
| KR | 1020230064763 A | 5/2023 |
| KR | 10-2024-0030459 A | 3/2024 |

\* cited by examiner

SYSTEMS AND METHODS FOR DETERMINING THE CHARGEABLE OR DISCHARGEABLE ENERGY OF A BATTERY ENERGY STORAGE SYSTEM

CROSS-REFERENCE TO RELATED APPLICATION

This application claims priority to and the benefit of U.S. Provisional Application 63/601,641 filed on Nov. 21, 2023, the disclosure of which is incorporated herein by reference.

TECHNICAL FIELD

The present disclosure relates to managing a battery energy storage system (BESS), and more particularly to accurately determining the chargeable/dischargeable energy of a BESS.

BACKGROUND

BESSs have become a critical component in modern energy management systems. With the increasing integration of renewable electricity sources such as wind and solar, which are inherently intermittent, energy storage solutions are necessary to ensure electrical grid stability and efficient power distribution. BESS technology allows for the storage of excess electricity during periods of low demand and discharge of scarce electricity during high demand, thereby optimizing energy usage (by reducing the curtailment of solar and wind electricity), reducing reliance on fossil fuel-based power generation such as gas turbines, and mitigating the effects of climate change by reducing the release of greenhouse gases. This capability is particularly valuable as the global transition to cleaner energy sources accelerates, and as intermittent electricity sources gain larger shares of the electricity supply mix.

Since the battery cells degrade over time (also known as "fade"), accurately predicting the available charge capacity at a point in the BESS life cycle is crucial. In some cases, battery cells may fail a capacity test, even when the battery cells are predicted to pass the test. A conventional calculation to estimate the available charge capacity of a BESS is as follows: (Site average state of charge (SOC) %)×(Nameplate Energy)×(Capacity Fade %)×(Number of BESS racks). This calculation has inaccuracies built-in and may impact the ability to fully discharge the BESS, and therefore decreases market revenue.

SUMMARY

Accordingly, the present disclosure describes a system and method for determining a chargeable/dischargeable energy of a subsystem of a BESS at a rated (specified) power. A neural network model considers the voltage, charge rate, and maximum temperature of the BESS subsystem to predict the total chargeable/dischargeable energy of the BESS over a dynamic time period divided into iterations (i.e., time intervals). The neural network model comprises an energy prediction sub-model and a state prediction sub-model. The energy prediction sub-model predicts a chargeable/dischargeable energy for a current iteration, and the state prediction sub-model predicts input features (e.g., an operating state including voltage, charge rate, and maximum temperature) for the next iteration. The neural network model iterates over the iterations in the time period and sums the chargeable/dischargeable energy for each iteration to arrive at the total chargeable/dischargeable energy of the subsystem of the BESS for the time period. The present system and method provides several advantages over conventional BESS energy calculations.

First, a user of a BESS using a conventional energy calculation may offer bids in an electricity market with an erroneous chargeable/dischargeable energy value (e.g., overestimated or underestimated), and therefore may incur a penalty and consequently a loss of revenue. In contrast, the present system and method may provide consistent and relatively accurate dischargeable (i.e., marketable) energy values, and therefore there is a significantly lower probability of incurring the penalty and loss in revenue.

Second, because the conventional energy calculation may erroneously guess the chargeable/dischargeable energy of the BESS for the full SOC range (e.g. 95%), the user may bid conservative estimates in the market, which may lead to revenue loss. In contrast, the present system and method may automatically calculate the chargeable/dischargeable energy in time intervals (e.g., every 2 minutes) based on a current system operating state. This real-time calculation means no guess work is involved regarding how much energy to discharge (thus improving revenue generation opportunity in the electricity market).

Third, the user, on a day-to-day basis, may be unaware of (significant) energy loss due to cell voltage imbalance (which may be the predominant factor), temperature variations, and fade (i.e., battery degradation). In contrast, the chargeable/dischargeable energy value generated by the present system and method automatically reveals the gap (with respect to installed or specified energy), thus highlighting negative impact of any cell voltage imbalance and other factors on the chargeable/dischargeable energy.

According to one aspect, the present disclosure is directed to system for determining a total chargeable/dischargeable energy of a subsystem of a battery energy storage system (BESS), the subsystem comprising battery cells, comprising: a controller comprising one or more processing modules and one or more non-transitory memory storage modules storing computing instructions, which when executed by the one or more processing modules is configured to: execute an iterative process over a dynamic time period, wherein the dynamic time period is divided into iterations, by using a neural network model comprising an energy prediction sub-model and a state prediction sub-model, wherein for each iteration of the iterations, the controller is configured to: (1) input into the energy prediction sub-model: a voltage of the subsystem for a current iteration of the iterations, a charge rate of the subsystem for the current iteration, and a maximum temperature of the subsystem for the current iteration; wherein the energy prediction sub-model is configured to output a chargeable/dischargeable energy of the subsystem for the current iteration; and (2) input into the state prediction sub-model: the voltage of the subsystem for the current iteration, the charge rate of the subsystem for the current iteration, the maximum temperature of the subsystem for the current iteration, and a charge rate difference for the current iteration; wherein the charge rate difference for the current iteration is the charge rate of the subsystem for the current iteration minus the charge rate of the subsystem for a previous iteration of the iterations; wherein the state prediction sub-model is configured to output a voltage of the subsystem for a next iteration of the iterations, the charge rate of the subsystem for the next iteration, the maximum temperature of the subsystem for the next iteration, and a charge rate difference for the next iteration.

In some cases, the voltage of the subsystem for the first iteration of the iterations may be determined using a voltage imbalance of the subsystem for the first iteration according to the equation:

$$V_t = CV\min_t/(1 - \alpha * \varepsilon)$$

where $CV\min_t$ is a minimum cell voltage of the battery cells of the subsystem for the first iteration, $\varepsilon$ is the voltage imbalance of the subsystem for the first iteration, and $\alpha$ is a scaling factor. The voltage imbalance is a function of the minimum cell voltage of the subsystem for the first iteration and the maximum cell voltage of the subsystem for the first iteration.

In some cases, the controller may be configured to repeat steps (1) and (2) until a last iteration of the iterative process is executed.

In some cases, the controller may be configured to determine the total chargeable/dischargeable energy of the subsystem of the BESS over the dynamic time period by summing the chargeable/dischargeable energy outputted by the energy prediction sub-model for each iteration.

In some cases, the controller may be configured to repeat steps (1) and (2) until the voltage of the subsystem for a next iteration of the iterative process output by the state prediction sub-model reaches a voltage limit.

In some cases, the dynamic time period may be determined by a time required to charge or discharge the subsystem of the BESS from a first iteration of the iterative process to a last iteration of the iterative process, wherein the last iteration of the iterative process is the iteration in which the voltage of the subsystem output by the state prediction sub-model reaches the voltage limit.

In some cases, the subsystem is selected from at least one of: a plurality of battery packs comprising the battery cells, or a plurality of battery racks comprising battery packs.

In some cases, a battery type of the battery cells of the subsystem is selected from the group consisting of: lithium nickel manganese cobalt (NMC), lithium iron phosphate (LFP), lithium sulfur (Li—S), solid state, nickel cadmium, nickel metal hydride (NiMH), zinc-air, iron-air, vanadium redox flow, sodium ion, potassium ion, aluminum ion, lead-acid, silicon anode, or a combination thereof.

In some cases, an architecture of the neural network model is selected from the group consisting of: multilayer perceptron (MLP), recurrent neural network (RNN), long short-term memory network, gated recurrent units (GRU), or a combination thereof.

In another aspect, the present disclosure is directed to a method for determining a chargeable/dischargeable energy of a subsystem of a battery energy storage system (BESS), the subsystem comprising battery cells, comprising: executing an iterative process over a dynamic time period, wherein the dynamic time period is divided into iterations, by using a neural network model comprising an energy prediction sub-model and a state prediction sub-model, wherein each iteration of the iterations comprises the following steps: (1) inputting into the energy prediction sub-model: a voltage of the subsystem for a current iteration of the iterations, a charge rate of the subsystem for the current iteration, and a maximum temperature of the subsystem for the current iteration; wherein the energy prediction sub-model outputs a chargeable/dischargeable energy of the subsystem for the current iteration; and (2) inputting into the state prediction sub-model: the voltage of the subsystem for the current iteration, the charge rate of the subsystem for the current iteration, the maximum temperature of the subsystem for the current iteration, and a charge rate difference for the current iteration; wherein the charge rate difference for the current iteration is the charge rate of the subsystem for the current iteration minus the charge rate of the subsystem for a previous iteration of the iterations; wherein the state prediction sub-model outputs a voltage of the subsystem for a next iteration of the iterations, the charge rate of the subsystem for the next iteration, the maximum temperature of the subsystem for the next iteration, and a charge rate difference for the next iteration.

It should be noted that the technical effects obtainable through the present disclosure are not limited to the above-described effects, and other effects that are not mentioned herein will be clearly understood by those skilled in the art from the following descriptions.

BRIEF DESCRIPTION OF THE DRAWINGS

The accompanying drawings illustrate exemplary aspects of the present disclosure and, together with the following detailed description, serve to provide further understanding of the technical spirit of the present disclosure. However, the present disclosure is not to be construed as being limited to the drawings.

DETAILED DESCRIPTION OF THE DISCLOSURE

The present disclosure may be variously changed and have various aspects, and the specific aspects disclosed herein in detail are used to facilitate an understanding of the present disclosure to those skilled in the art.

Therefore, it should be understood that there is no intention to limit the present disclosure to the particular aspects disclosed, and on the contrary, the present disclosure covers all modifications, equivalents, and alternatives falling within the spirit and scope of the present disclosure.

In this application, it should be understood that terms such as "include" or "have" are intended to indicate the presence of a feature, number, step, operation, component, part, or a combination thereof described on the specification, and they do not preclude the possibility of the presence or addition of one or more other features or numbers, steps, operations, components, parts or combinations thereof.

Figure 1:
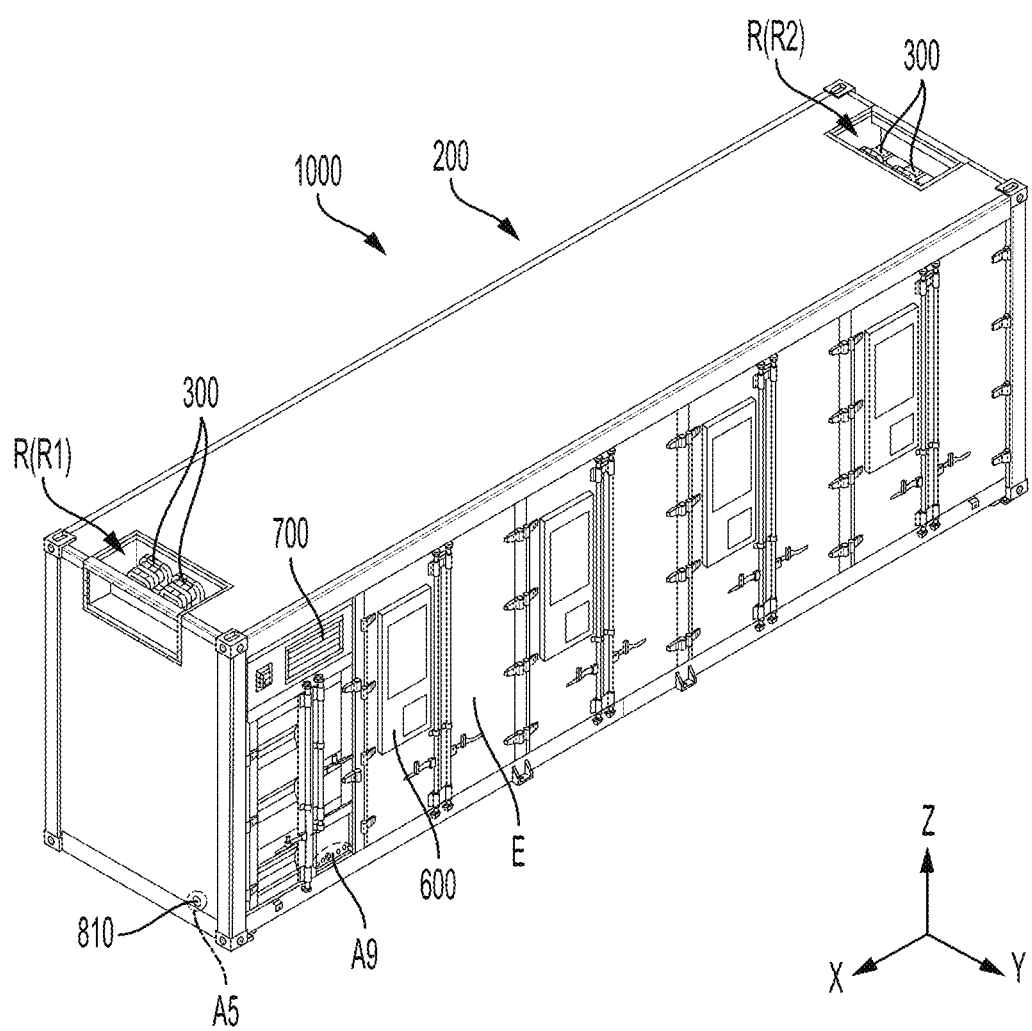
FIG. 1 is a perspective view schematically showing the configuration of a battery container in accordance with an aspect of the present disclosure.
Figure 2:
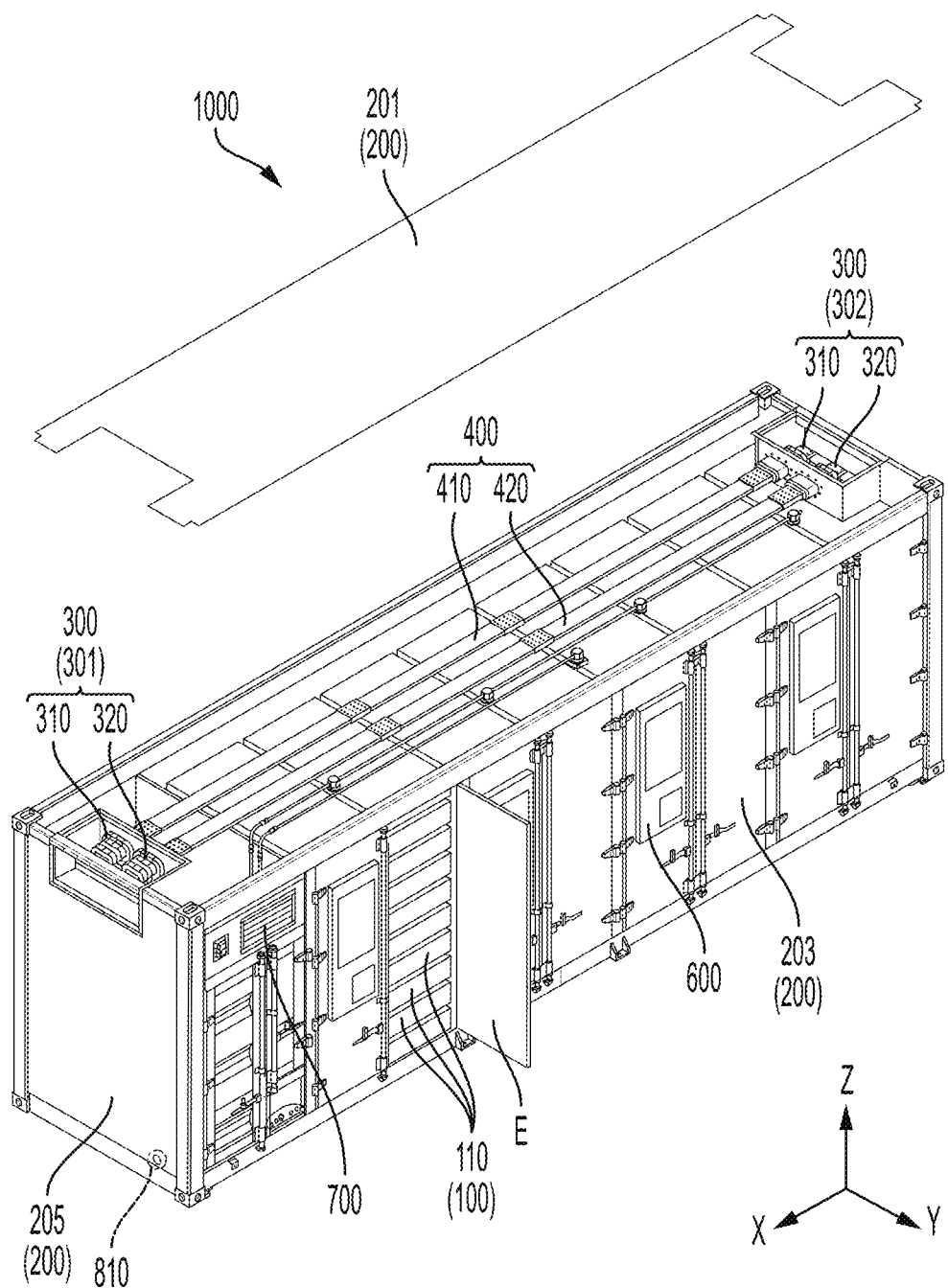
FIG. 2 is a perspective view schematically showing a form in which some components of the battery container are separated or moved according to in accordance with an aspect of the present disclosure.
Figure 3:
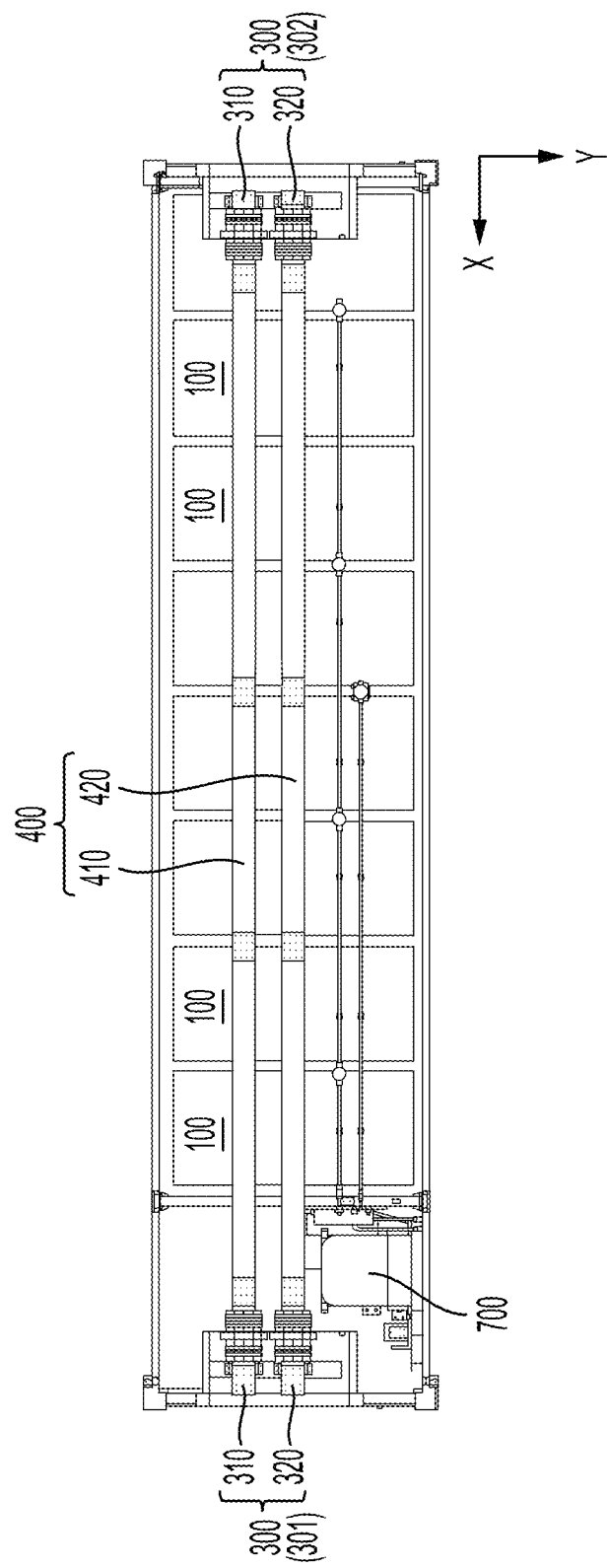
FIG. 3 is a diagram showing the internal configuration of the battery container in accordance with an aspect of the present disclosure, viewed from above.

FIG. 1 is a perspective view schematically showing the configuration of a battery container 1000 according to an aspect of the present disclosure. Also, FIG. 2 is a perspective view schematically showing a form in which some components of the battery container 1000 are separated or moved according to an aspect of the present disclosure. FIG. 3 is a diagram showing the internal configuration of the battery container 1000 according to an aspect of the present disclosure, viewed from above.

Referring to FIGS. 1 to 3, a battery container 1000 according to the present disclosure includes a battery rack 100, a container housing 200, a main connector 300, and a main bus bar 400.

The battery rack 100 may include a plurality of battery modules 110. Here, each battery module 110 may be configured in a form in which a plurality of battery cells (secondary batteries) are accommodated in a module case. In addition, the battery modules 110 may be stacked in one direction, such as in an upper and lower direction, to form a battery rack 100. In particular, the battery rack 100 may include a rack case to facilitate stacking of the battery modules 110. In this case, a plurality of battery modules 110 may be accommodated in respective storage spaces provided in the rack case to form a module stack. In some aspects, the battery modules 110 may be arranged in other configurations, such as side-by-side or in a matrix pattern. The rack case may include features like cooling channels or structural reinforcements to support the weight of the stacked modules. In some cases, the battery rack 100 may incorporate sensors to monitor temperature, voltage, or other parameters of the battery modules 110.

The battery module 110 included in the battery rack 100 may further include a control unit such as a battery management system (BMS) for each group or certain groups. For example, a separate pack BMS may be provided for each battery module 110. In this case, each battery module 110 may be referred to as a battery pack. That is, it may be regarded that the battery rack 100 includes a plurality of battery packs. In various descriptions below, the battery module 110 may be replaced with a battery pack. In some cases, the battery rack 100 may incorporate sensors to monitor parameters like temperature, voltage, or current of the battery modules 110. The BMS for each battery module or pack may communicate with a higher-level rack BMS to coordinate overall rack performance and safety.

One or more battery racks 100 may be included in the battery container 1000. In particular, a plurality of battery racks 100 may be included in the battery container 1000. Also, the plurality of battery racks 100 may be disposed in at least one direction, for example, in a horizontal direction. For example, eight battery racks 100 may be included in the battery container 1000, and the plurality of battery racks 100 may be arranged in left and right directions (X-axis direction) inside the battery container 1000. When a plurality of battery racks 100 are included, a separate control unit, such as a rack BMS, may be provided for each battery rack 100. In this case, the rack BMS may be connected to the plurality of pack BMSs to exchange data and control the plurality of pack BMSs. Meanwhile, when the battery container 1000 includes at least one rack BMS, the rack BMS may be connected to a separate control device provided outside the battery container 1000, such as a control container. In addition, the control container may be connected to a rack BMS or a pack BMS of the battery container 1000 to control the same or exchange data with the same.

An empty space may be formed inside the container housing 200. Also, the container housing 200 may accommodate the battery rack 100 in the inner space. More specifically, the container housing 200 may be formed in a substantially rectangular parallelepiped shape, as shown in FIG. 1 and the like. In this case, the container housing 200 may include an upper housing 201, a lower housing, a front housing 203, a rear housing, a left housing 205, and a right housing around the inner space. Also, the container housing 200 may accommodate the battery rack 100 in the inner space defined by these six unit housings.

The container housing 200 may be made of a material that secures a certain level of rigidity and stably protects internal components from external physical and chemical factors. For example, the container housing 200 may be made of a metal material, such as steel, aluminum, or titanium, or may have such a metal material. In some aspects, the container housing 200 may be constructed from composite materials like carbon fiber reinforced polymers or fiberglass, which offer high strength-to-weight ratios. The housing may also incorporate corrosion-resistant alloys like stainless steel or galvanized steel in areas exposed to harsh environmental conditions. In some cases, the container housing 200 may utilize a combination of materials, such as a steel frame with aluminum panels, to balance strength, weight, and cost considerations. Additionally, the housing may include specialized coatings or treatments, such as powder coating or anodizing, to enhance durability and weather resistance.

The container housing may have a size identical or similar to the size of a shipping container. In addition, the container housing may follow the standards of a shipping container predetermined according to the ISO standards or the like. For example, the container housing may be designed with identical or similar dimensions as a 20-foot container or a 40-foot container. However, the size of the container housing may be appropriately designed depending on the situation. In particular, the size or shape of the container housing may be set variously according to the construction scale, shape, topography, or the like of a system to which the battery container is applied, such as an energy storage system. The present disclosure may not be limited by to the size or shape of the container housing. In some aspects, for example, the container housing may have other shapes such as cylindrical, spherical, or custom polygonal shapes. The housing may also be modular, allowing for expansion or contraction based on capacity needs. In some cases, the container housing may incorporate features like sloped roofs for water runoff or reinforced walls for increased durability in harsh environments.

The main connector 300 may be configured to be electrically connected to the outside. That is, with respect to the battery container 1000, the main connector 300 may be configured to be connected to another component outside the battery container 1000, for example another battery container 1000 or a control container equipped with a control unit such as a battery system controller (BSC).

The main connector 300 may be located on at least one side of the container housing 200. For example, the main connector 300 may be located on the left or right side of the container housing 200. Moreover, a plurality of main connectors 300 may be included in the battery container 1000. For example, as shown in FIGS. 2 and 3, the main connector 300 may include two main connectors 300, namely a first connector 301 and a second connector 302.

The plurality of main connectors 300 may be located on different sides of the container housing 200. Moreover, the plurality of main connectors 300 may be located on opposite sides of the container housing 200. For example, as shown in FIGS. 1 to 3, the first connector 301 and the second connector 302 may be provided on the left and right sides of the container housing 200, respectively. In some aspects, the main connectors 300 may be located on the roof or floor of the container housing 200. In some cases, the main connectors 300 may be positioned at corners or edges of the container housing 200. The main connectors 300 may also be arranged in various configurations, such as in a staggered pattern or aligned vertically along the sides of the container housing 200. In some implementations, additional main connectors may be included on the front or back sides of the container housing 200 to provide further connection options.

The main bus bar 400 may be configured to transmit power. In particular, the main bus bar 400 may serve as a path through which a charging power and a discharging power for the battery rack 100 included in the corresponding battery container 1000 are transmitted. To this end, the main bus bar 400 may be electrically connected to each terminal of the battery module 110 provided in the battery rack 100. Also, the main bus bar 400 may be connected to the main connector 300. Accordingly, the main bus bar 400 may serve as a path through which a charging power is transferred from the main connector 300 to the battery module 110. In addition, the main bus bar 400 may serve as a path through which a discharging power is transmitted from the battery module 110 to the main connector 300.

Moreover, the main bus bar 400 may function as a power transmission line between the plurality of main connectors 300. To this end, different ends of the main bus bar 400 may be connected to different main connectors 300. For example, the main bus bar 400 may be a power line elongated in one direction, for example in left and right directions. In this case, both ends of the main bus bar 400 may be connected to different main connectors 300, for example the first connector 301 and the second connector 302. Also, the main bus bar 400 may serve as a path for transmitting power between different main connectors 300, for example between the first connector 301 and the second connector 302.

The main bus bar 400 may include two unit bus bars, namely a positive electrode bus bar 410 and a negative electrode bus bar 420, in order to function as a power transmission path. The positive electrode bus bar 410 may be connected to a positive electrode terminal of the battery rack 100 or a positive electrode terminal of the battery module 110 included therein. Also, the negative electrode bus bar 420 may be connected to a negative electrode terminal of the battery rack 100 or a negative electrode terminal of the battery module 110 included therein.

In addition, the main connector 300 may be separately provided at each end of the positive electrode bus bar 410 and the negative electrode bus bar 420. For example, the first connector 301 and the second connector 302 may be provided at the left and right ends of the positive electrode bus bar 410, respectively. The first connector 301 and the second connector 302 provided at both ends of the positive electrode bus bar 410 may be a positive electrode connector 310. Also, the first connector 301 and the second connector 302 may be provided at the left end and the right end of the negative electrode bus bar 420, respectively. The two connectors provided at both ends of the negative electrode bus bar 420, namely the first connector 301 and the second connector 302, may all be negative electrode connectors 320.

In addition, the battery container 1000 according to the present disclosure may include a cable cover CC. The cable cover CC may be configured to surround a cable connected to the battery container 1000. For example, a plurality of power cables may be connected to the terminal bus bar TB to transfer power. In this case, the cable cover CC may be located at one end, for example a lower end, of the terminal cover TC to protect a plurality of power cables connected to the terminal bus bar TB. Alternatively, the battery container 1000 may be connected to a data cable to exchange various data with other external components, such as the control container 2000. In this case, the cable cover CC may be configured to protect data cables or the like connected to the battery container 1000 from the outside.

In particular, the cable cover CC may include a cable tray CC1 and a tray cover CC2. The cable tray CC1 may include a body portion attached to an outer wall of the container housing 200 and a sidewall portion protruding outward from an edge of the body portion. For example, the sidewall portion may be formed to protrude to the left from the front edge and the rear edge of the body portion. The tray cover CC2 may be coupled to the end of the sidewall portion protruding from the body portion of the cable tray CC1 to form an empty space therein together with the body portion and the sidewall portion. In particular, this empty space may be formed in a hollow shape. Accordingly, the cable may extend outward from the battery container 1000 through the empty space of the cable cover CC. In addition, the cable extending to the outside may be connected to other external components, such as the control container 2000 or another battery container 1000.

According to this aspect, by minimizing the exposure of the cable extending from the battery container 1000 to the outside, it is possible to protect the cable and prevent damage or breakage of the cable. Moreover, the cable cover CC is configured to have a hollow formed downward at the side surface of the container housing, so that the cable accommodated inside may be exposed downward to the outside. In this case, it may be advantageous for installation, management, and undergrounding of the cable.

In addition, the battery container 1000 according to the present disclosure may further include an air conditioning module 600 as shown in FIGS. 1 and 2. The air conditioning module 600 may be configured to regulate air inside the container housing 200. In particular, the air conditioning module 600 may control the temperature state of an internal air. Moreover, the air conditioning module 600 may be configured to circulate air inside the container housing 200 to control the temperature of various electronic equipment such as the battery rack 100 or the rack BMS included in the battery container 1000 within a certain range. In particular, the air conditioning module 600 may cool the air inside the container housing 200. For example, the air conditioning module 600 may be configured to absorb heat from the air inside the container housing 200 and discharge the heat to the outside. In addition, the air conditioning module 600 may be configured to remove dust or foreign substances from the air inside the container housing 200.

Representatively, the air conditioning module 600 may include at least one HVAC (Heating, Ventilation, & Air Conditioning). For example, the battery container 1000 according to the present disclosure may include four HVACs. The HVAC may allow air to circulate inside the container housing 200. In this case, the temperature of the battery rack 100 may be lowered, and a temperature difference between the battery racks 100 included in the container housing 200 or between the battery modules 110 may be reduced.

In particular, the container housing 200 may include at least one door, as indicated by E in FIGS. 1 and 2, to facilitate installation, maintenance, or repair of the battery rack 100. For example, the container housing 200 may have eight doors E on the front side. Also, two doors E may be opened and closed as a pair in a casement form. In addition, such a door E may be additionally provided on another part of the container housing 200, for example at the rear surface.

In this way, when the door E is provided to the container housing 200, the HVAC may be installed in the door E of the container housing 200. For example, when two doors E are configured as a pair, the HVAC may be provided to one of the two doors E. In addition, the HVAC, namely the air conditioning module 600, may be configured to penetrate the container housing 200, particularly the door E. In this case, one surface of the air conditioning module 600 may be exposed to the outside of the container housing 200, and the other surface of the air conditioning module 600 may be exposed to the inside of the container housing 200. Accordingly, the inner surface of the air conditioning module 600 may contact the internal air of the container housing 200 to absorb heat, and the outer surface of the air conditioning module 600 may contact the external air of the container housing 200 to discharge heat.

The air conditioning module 600 may be configured to prevent direct contact between internal air and external air. That is, the air conditioning module 600 may be configured to prevent internal air from being discharged to the outside and to prevent external air from being introduced into the inside. Therefore, even if the temperature inside the container housing 200 rises, the air conditioning module 600 may absorb only heat from the internal air and discharge the heat to the outside without directly discharging the internal air to the outside. According to this aspect, even if a fire or toxic gas is generated inside the battery container 1000, it is possible to prevent the fire or toxic gas from being discharged to the outside and causing damage to other devices such as other nearby battery containers 1000 or workers at the outside.

In addition, the battery container 1000 according to the present disclosure may further include a venting module 700 as shown in FIGS. 1 and 2. The venting module 700 may be configured to discharge gas inside the container housing 200 to the outside. In addition, the venting module 700 may introduce an external air of the container housing 200 into the inside. Accordingly, the venting module 700 may function as a ventilation device. That is, the venting module 700 may exchange or circulate gas between the inside and the outside of the container housing 200.

In particular, the venting module 700 may be configured to operate in an abnormal situation, such as when a venting gas or fire is generated in a specific battery module 110. Moreover, the venting module 700 may be configured to discharge gas to the outside when the gas or the like is generated inside the container housing 200 due to a thermal runaway phenomenon or the like of the battery rack 100. Moreover, the venting module 700 may be configured to be in a closed state in a normal state and be switched to an open state in an abnormal state such as a thermal runaway situation. In this case, since the venting module 700 performs active ventilation, the venting module 700 may be referred to as an AVS (Active Ventilation System) or include such a system.

In this case, it is possible to prevent a larger problem such as an explosion from occurring due to an increase in the internal pressure of the battery container 1000. In addition, in this case, by rapidly discharging a combustible gas inside the container housing 200 to the outside, it is possible to lower the possibility of a fire in the battery container 1000 or delay the occurrence of a fire, and the scale of a fire may be reduced.

Meanwhile, in the aspect where both the venting module 700 and the air conditioning module 600 are included, in a normal situation, the venting module 700 may not operate, but the air conditioning module 600 may operate. In this case, in the process of cooling, it is possible to prevent foreign substances or moisture from flowing into the container housing 200 through the venting module 700. According to this aspect, since the air conditioning module 600, the venting module 700, and the like are included in the battery container 1000, just by transporting and installing the battery container 1000, the air conditioning module 600 or the venting module 700 may be transported and installed together. Therefore, on-site installation work for installing the energy storage system may be minimized, and the connection structure may be simplified.

In this aspect, the air conditioning module 600 and/or the venting module 700 may operate under the control of the control container 2000. Alternatively, the air conditioning module 600 and/or the venting module 700 may be controlled by a control unit included in the battery container 1000, such as a rack BMS that controls the charge/discharge operation of each battery rack 100 or another separate control unit.

In addition, the battery container 1000 according to the present disclosure may include at least one sensor and provide sensing information to the rack BMS included in the battery container 1000, another separate control unit, or the control container 2000. For example, a temperature sensor, a smoke sensor, an $H_2$ sensor, and/or a CO sensor may be included in the battery container 1000. In this case, the operation of the air conditioning module 600 and/or the venting module 700 may be controlled based on the information sensed by these sensors. The battery container 1000 may further include a firefighting connector 810 to a firefighting module (not shown).

Figure 4:
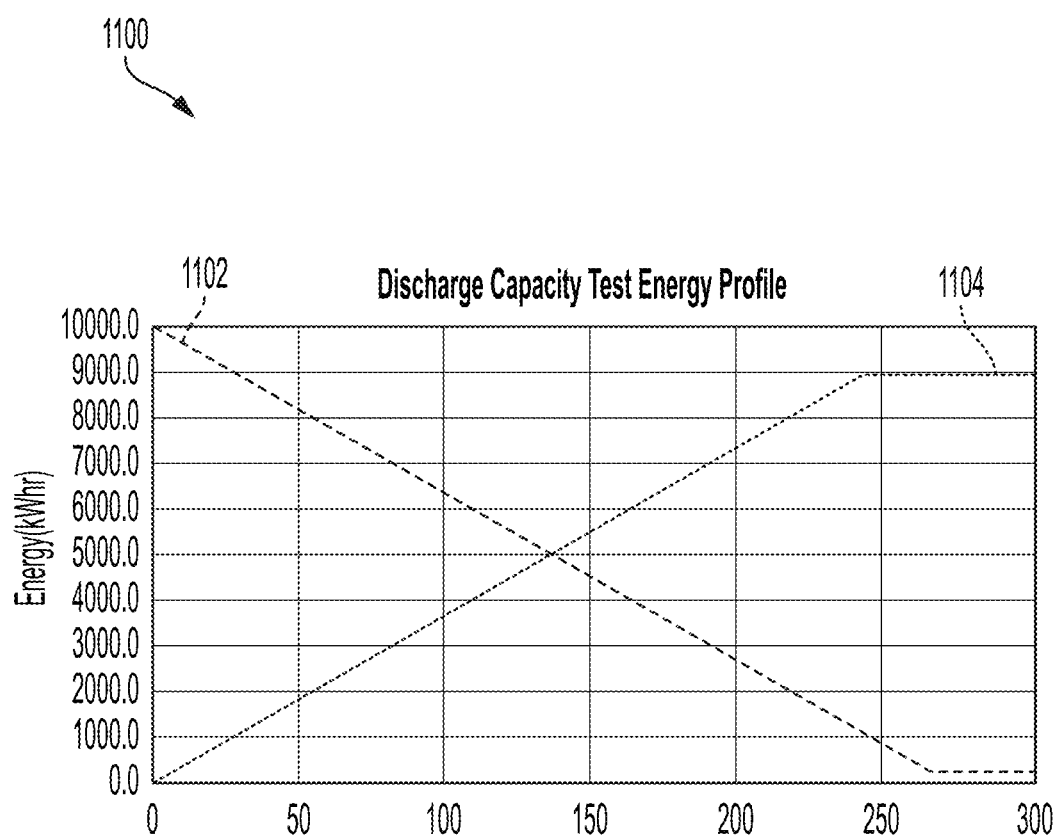
FIG. 4 is a graph showing the discrepancy between estimated chargeable/dischargeable energy and actual discharged energy of a BESS subsystem.

FIG. 4 shows, as an example, a graph 1100 illustrating the discharge of a BESS site specified at 10 MWhr (energy) and 2.5 MW (power) with a 4 hour discharge time at beginning of life (BOL). The BESS was estimated to discharge about 10 MWhr based on a conventional calculation (represented by curve 1102). However, when the BESS site was fully discharged at the specified power, the actual energy discharged before reaching the power limit was about 9 MWhr over 4 hours (represented by curve 1104). Therefore, the BESS site failed the capacity test, even though the BESS should have passed the capacity test.

The discrepancy between the estimated discharge energy and the actual discharge energy may be explained by cell voltage imbalance, which is the difference between the maximum and minimum cell voltage across a given BESS subsystem (e.g., pack, module, rack, string, or group of racks). A BESS considers these minimum and maximum cell voltages to ensure that batteries are not discharged below the minimum cell voltage or charged above the maximum cell voltage. When discharging, cell voltage imbalance traps energy that would otherwise be discharged (in cells that have a voltage above the minimum cell voltage), and when charging, cell voltage imbalance traps energy that would otherwise be charged (in cells that have a voltage below the maximum cell voltage). Cell voltage imbalance may lead to issues in balancing electrical grid supply and demand, and may necessitate the use of polluting and inefficient back-up power sources such as gas turbines. To address cell voltage imbalance, a battery management system (BMS) may passively balance cells, which may occur when the BESS subsystem SOC is above a threshold, and the drawn current is below a threshold. For this reason, continuous usage of the BESS without a rest period exacerbates cell voltage imbalance.

Figure 5:
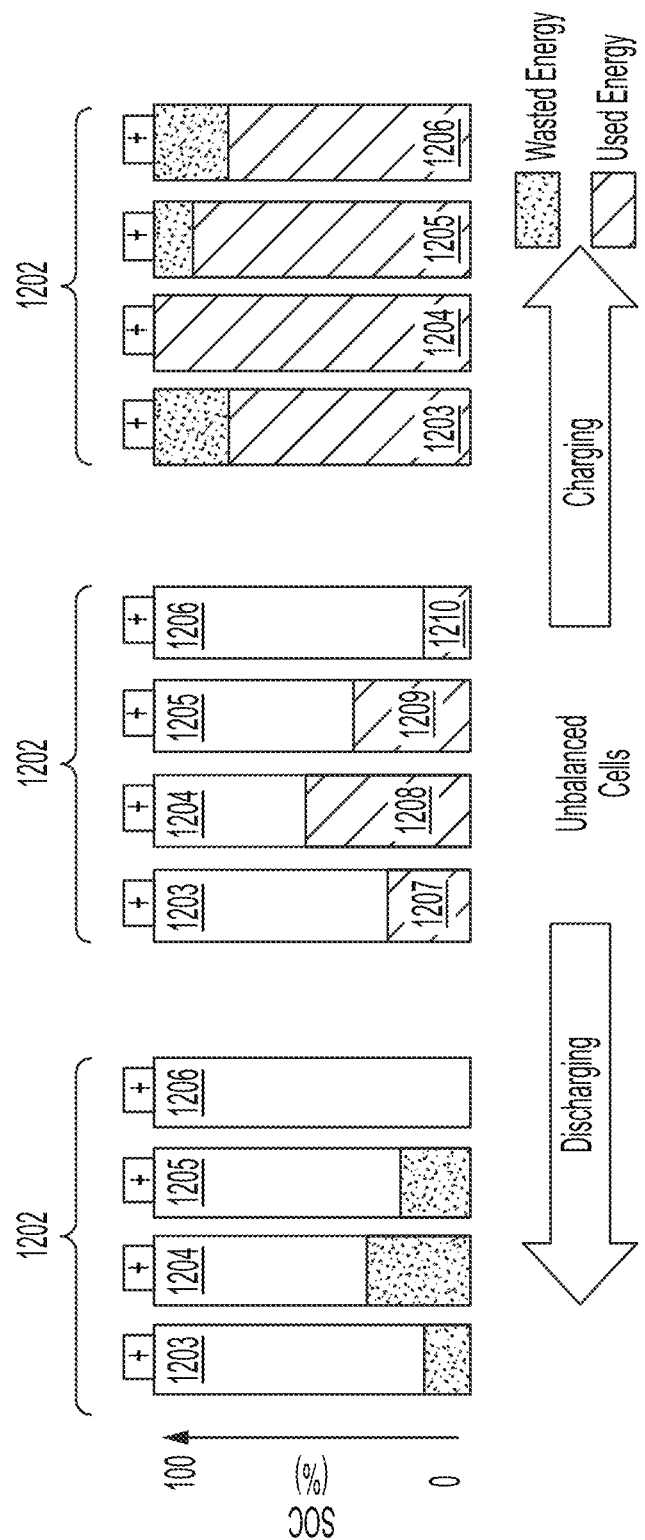
FIG. 5 is a conceptual image illustrating the effect of unbalanced voltage levels between battery cells on the chargeability and dischargeability of a BESS subsystem.

FIG. 5 is a diagram illustrating the effect of cell voltage imbalance. A group of imbalanced battery cells 1202 may include a cell 1204 with the highest voltage level 1208, a cell 1206 with the lowest voltage level 1210, and cells 1203 and 1205 with intermediate voltage levels 1207 and 1209. As shown on the left, when discharging, energy is unable to be fully discharged from the cells 1203, 1204 and 1205 (represented by the hatched area) due to being limited by the cell 1206 with the lowest voltage level 1210. As shown on the right, energy is unable to fully charge the cells 1203, 1205 and 1206 (represented by the hatched area) due to being limited by the cell 1204 with the highest voltage level 1208.

Figure 6A:
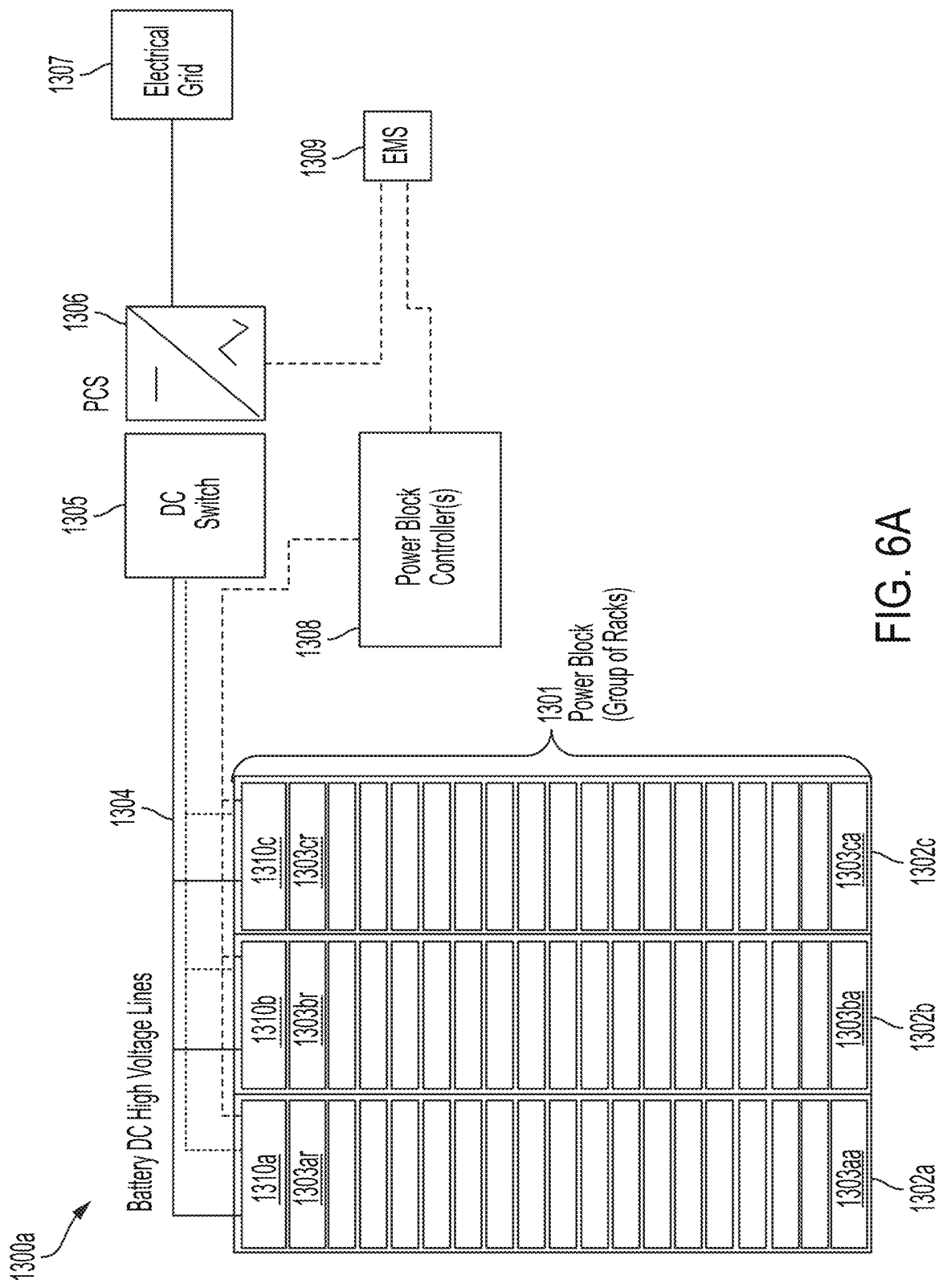
FIG. 6A is a schematic diagram illustrating a BESS subsystem comprising a power block in accordance with an aspect of the present disclosure.

FIG. 6A is a diagram showing a BESS subsystem 1300a in accordance with an aspect of the present disclosure. The BESS subsystem 1300a may include a power block 1301 comprising a plurality of battery racks 1302a, 1302b and 1302c, which in turn respectively comprise a plurality of battery packs 1303aa-ar, 1303ba-br, and 1303ca-cr, and battery protection units (BPUs) 1310a, 1310b and 1310c. The racks 1302a-c may comprise physical structures with a standardized form (e.g., a steel or aluminum frame), allowing for easy installation, management, and scalability. A suitable exemplary battery rack may be, for example, the TR1300 (Model ERT5422CN201) manufactured by LG Energy Solution. In some aspects, the racks may be constructed from other materials such as carbon fiber composites, fiberglass, or reinforced plastics to reduce weight while maintaining strength. Each of the battery packs 1303aa-ar, 1303ba-br, and 1303ca-cr may comprise one or more battery modules, and may be connected to monitoring and management electronics such as a battery management system (BMS). Each of the battery modules may comprise a plurality of battery cells connected together, which may be encased and managed as a single unit. The battery cells are the smallest unit of the BESS, where the electrochemical reaction occurs to store and release energy. The cells may have different form factors, such as cylindrical, pouch, or prismatic. In each of the battery racks 1302a-c, the battery packs 1303aa-ar, 1303ba-br and 1303ca-cr may be electrically connected in series with respect to each other, although the present disclosure is not limited thereto. The battery racks 1302a-c may be electrically connected in parallel with respect to each other, although the present disclosure is not limited thereto. The battery racks 1302a-c and battery packs 1303aa-ar, 1303ba-br and 1303ca-cr may be connected in any series or parallel arrangement to achieve a target power output. While battery packs and/or modules are described in this particular aspect, other racks that exclude packs and/or modules are contemplated within the scope of this disclosure. For example, the rack may comprise a plurality of battery cells, without any module.

The BPUs 1310a-c, which may be referred to as rack BMSs, include electrical and communication interfaces that connect to the packs 1303aa-ar, 1303ba-br and 1303ca-cr within each respective rack 1302a, 1302b and 1302c. BPUs 1310a-c may be electrically and communicationally connected to the voltage lines 1304 and one or more power block controllers 1308.

The battery racks 1302a-c may be electrically connected to an electrical grid 1307 via voltage lines 1304. The DC switch 1305 may be used to disconnect or isolate the battery from other components for maintenance, safety, or in the event of a fault, particularly from the power conversion system (PCS) 1306, or grid-tied inverter. In the case of an overvoltage, overcurrent, or other fault in the system, the DC switch 1305 may quickly interrupt the current to prevent damage to the power block 1301 or other components. The PCS 1306 manages the conversion between DC power from the power block 1301 and AC power for use by the electrical grid 1307 (i.e., the load). The PCS 1306 may include both an inverter (DC to AC) and a rectifier (AC to DC), enabling bidirectional energy flow between the power block 1301 and the electrical grid 1307. The PCS 1306 synchronizes the output from the power block 1301 with the voltage, frequency, and phase of the grid 1307, allowing the power block 1301 to smoothly inject electricity into the grid 1307 or absorb electricity from the grid 1307.

The energy management system (EMS) 1309 may coordinate and optimize the overall energy flows in the BESS subsystem 1300a. The EMS 1309 may handle the strategic decisions of when and how energy should be stored or discharged, and may integrate multiple energy resources (for example, co-located solar and wind electricity connected in a microgrid and/or the grid 1307). The EMS 1309 may decide when the BESS subsystem 1300a should store or discharge electricity based on load demands, market signals (e.g., electricity prices such as locational marginal prices (LMP)), and the availability of renewable electricity, and may manage the interaction between the power block 1301 and the grid 1307, providing services such as frequency regulation, voltage support, demand response.

The power block controller (PBC) 1308 may control and operate individual components within the BESS subsystem 1300a, such as the battery packs 1303aa-ar, 1303ba-br and 1303ca-cr and the battery modules and cells therein, and ensures the safe and efficient operation of the BESS subsystem 1300a at the hardware level. The PBC 1308 may work in conjunction with one or more BMSs to ensure safe operation of the battery cells, preventing overcharging, deep discharging, or temperature issues. In coordination with the EMS 1309, the PBC 1308 may manage the conversion of DC power from the power block 1301 into AC power for the grid 307 and vice versa (coordinating with the EMS to follow power setpoints) and may make adjustments in real time ensure that the power output from the PB 1301 meets the voltage and frequency requirements of the grid 1307. The PBC 1308 may monitor the power block 1301 for faults and execute protective mechanisms in response to issues such as overvoltage, overcurrent, or overheating, for example, in conjunction with the DC switch 1305. The PBC 1308 may be responsible for executing commands from the EMS 1309 at the hardware level.

Figure 6B:
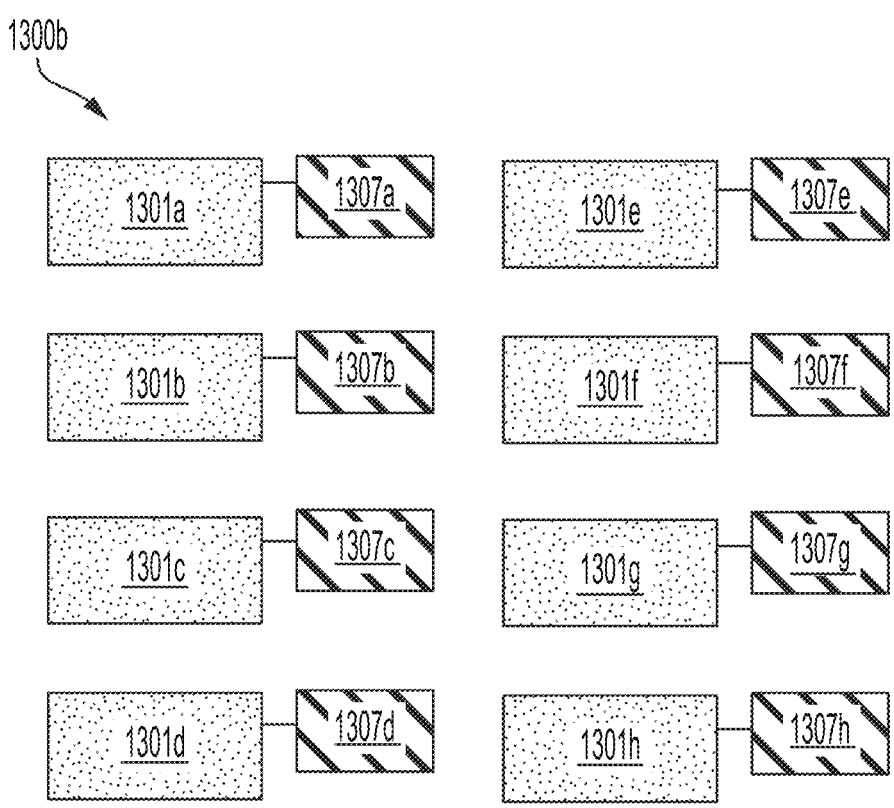
FIG. 6B is a schematic diagram illustrating a BESS site comprising a plurality of power blocks in accordance with an aspect of the present disclosure.

FIG. 6B shows a BESS site 1300b comprising a plurality of power blocks 1301a-h (e.g., similar to the power block 1301) each connected to a respective PCS 1307a-h. A single cell in a given power block 1301a-h may decrease the capacity of the entire BESS site 1300b. For example, if a single cell in power block 1301a reaches a minimum voltage faster than other cells in the power block 1301, the capacity of the entire BESS site 1300b may potentially be reduced by about ⅛th of its specified capacity, thus illustrating the importance of managing cell voltage imbalance.

Figure 7:
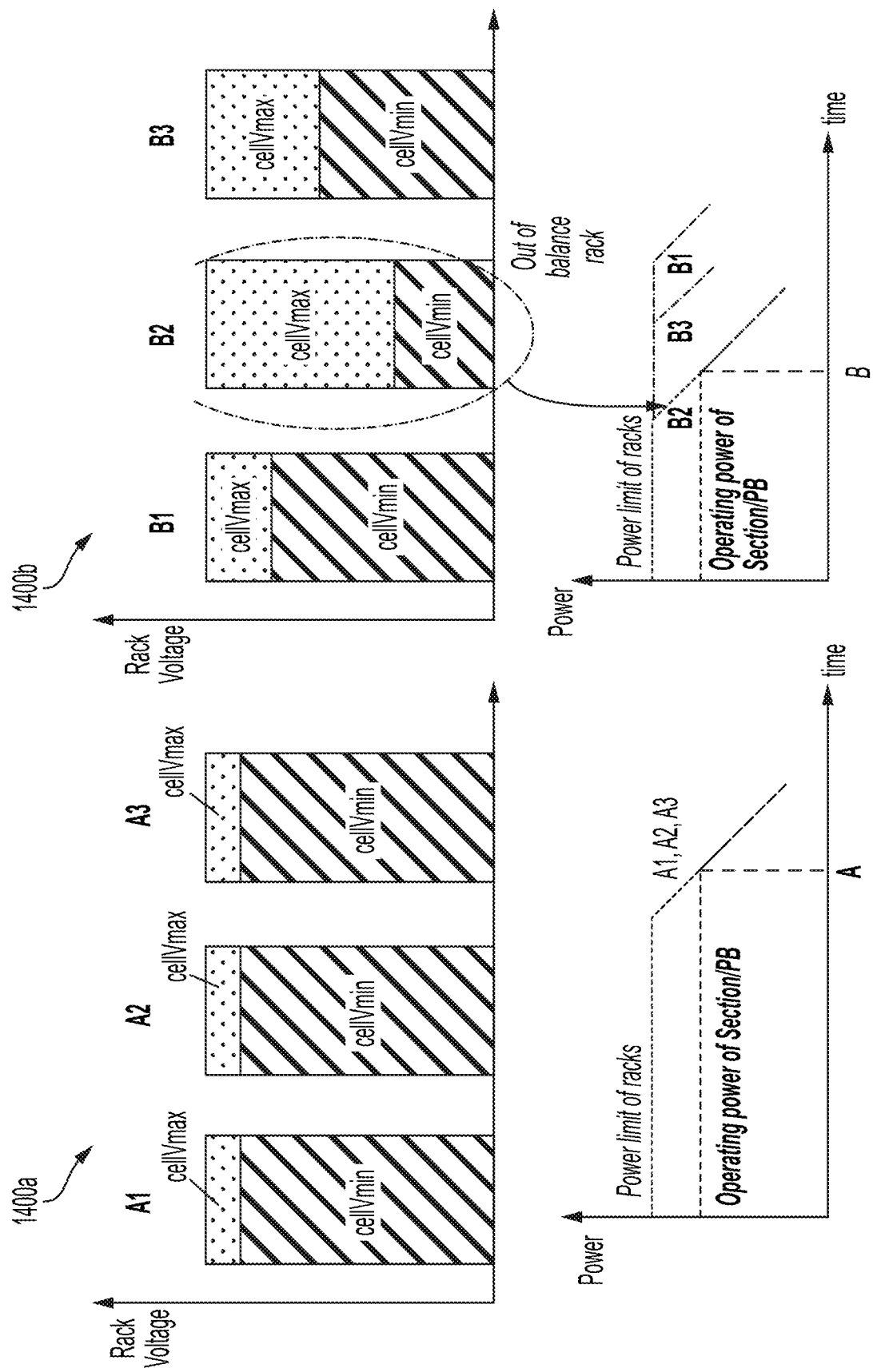
FIG. 7 are graphs showing the effect of unbalanced voltage levels between racks on the operating power of a power block.

FIG. 7 are graphs 1400a and graphs 1400b showing the effect of unbalanced voltage levels between racks on the operating power of a power block. As shown in graph 1400a, the racks A1, A2 and A3 have about the same minimum voltage level between them. As time progresses, the operating power of the power block comprising the racks A1-A3 is about the same at the same time point. In contrast, as shown in graphs 1400b, the racks B1, B2 and B3 have differing minimum voltage levels between them. The rack B2 forces the power block to reach a particular operating power sooner as time progresses, limiting the ability of racks B1 and B3 to discharge at higher operating powers at the same time point.

Figures 8A, 8B:
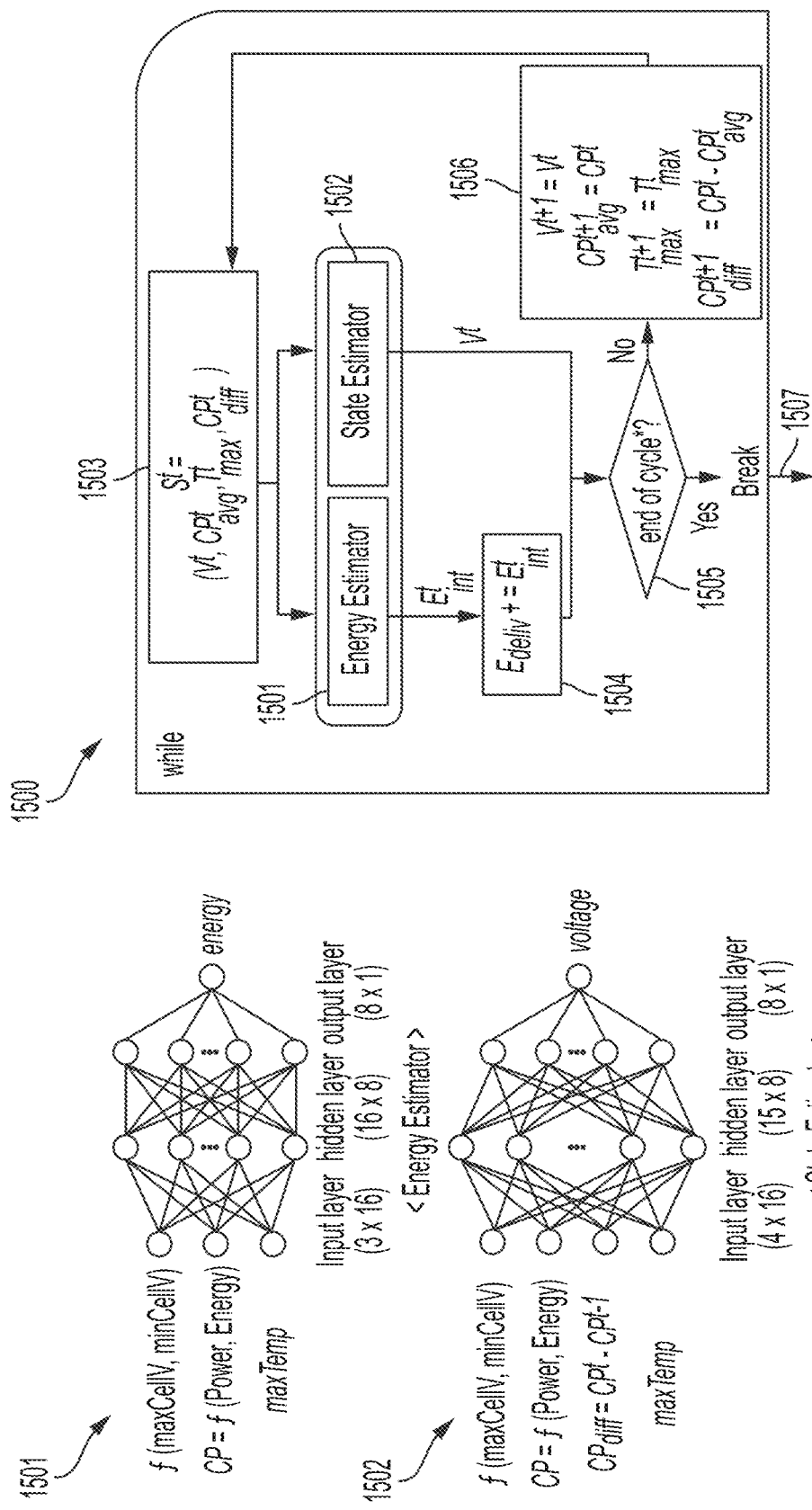
FIG. 8A is a conceptual diagram illustrating a model for determining a chargeable/dischargeable energy of a subsystem of a BESS according to an aspect of the present disclosure.
FIG. 8B is a flow diagram illustrating the implementation of a model for determining a chargeable/dischargeable energy of a subsystem of a BESS according to an aspect of the present disclosure.

FIG. 8A is a conceptual diagram illustrating a model for determining a chargeable/dischargeable energy 1507 of a subsystem of a BESS (for example, the BESS subsystem 1300a shown in FIG. 6A) according to aspects of the present disclosure. The model determines the chargeable/dischargeable energy at the rated power of the BESS subsystem and is a function of the operating state of the BESS subsystem (the voltage, maximum cell temperature, and charge rate).

The chargeable/dischargeable energy may be determined separately for each subsystem in the BESS site. The chargeable/dischargeable energy calculated at each subsystem may be summed together to determine the total chargeable/dischargeable energy of the BESS site (or the total chargeable/dischargeable energy of a group of subsystems). In some cases, a chargeable/dischargeable energy is calculated for each battery pack in a group of battery packs (a battery rack), and the chargeable/dischargeable energies calculated for each battery pack are summed together to determine the chargeable/dischargeable energy of the battery rack. In some cases, a chargeable/dischargeable energy is calculated for each battery rack in a group of battery racks (a power block), and the dischargeable energies calculated for each battery rack are summed together to determine the chargeable/dischargeable energy of the power block. In some cases, a chargeable/dischargeable energy is calculated for each power block in a group of power blocks (a BESS site), and the chargeable/dischargeable energies calculated for each power block are summed together to determine the chargeable/dischargeable energy of the BESS site.

The model may comprise an energy prediction sub-model 1501 and a state prediction sub-model 1502. One or both of the sub-models 1501 or 1502 may be implemented as a neural network model implementing machine learning. The energy prediction sub-model 1501 predicts the chargeable/dischargeable energy for the current iteration, and the state prediction sub-model 1502 predicts the operating state (e.g., voltage, charge rate, and maximum cell temperature) for the next iteration. The model may be executed as an iterative process over a dynamic time period (i.e., a cycle) divided into iterations (i.e., time intervals). The time period may be a minute, an hour, a day, a month, etc. Each iteration may be defined or configured in seconds, minutes, hours, etc. (smaller iterations may produce more accurate results). In some cases, each iteration is defined or configured as any value in the range of from 1 minute to 15 minutes. In one example, the dynamic time period is determined as 24 hours, and each iteration is defined or configured as 2 minutes. In this way, the chargeable/dischargeable energy of the BESS subsystem may be calculated every 2 minutes, and the total chargeable/dischargeable energy of the BESS subsystem may be calculated by summing together the dischargeable energies calculated for each 2-minute iteration.

As shown in the flow diagram 1500 of FIG. 8B, the model may be implemented by inputting features 1503 (i.e., the operating state of the BESS subsystem) into the energy prediction sub-model 1501 and the state prediction sub-model 1502. The features 1503 may include a voltage (i.e., operating voltage) of the subsystem for a current iteration, a charge rate of the subsystem for the current iteration, and a maximum temperature (e.g., highest temperature among the battery cells) of the subsystem for the current iteration. For the state prediction sub-model 1502, charge rate difference (the charge rate of the subsystem for the current iteration minus the charge rate of the subsystem for a previous iteration) is additionally input.

The energy prediction sub-model 1501 outputs a chargeable/dischargeable energy 1504 of the subsystem for the current iteration. The state prediction sub-model 1502 outputs the operating state 1506 for the next iteration (becoming the input features 1503 of the next iteration) which may include a voltage of the subsystem for the next iteration, the charge rate of the subsystem for the next iteration, the maximum temperature of the subsystem for the next iteration, and a charge rate difference for the next iteration. After inputting the initial voltage, initial charge rate, and initial maximum temperature for the first iteration of the time period, the model may predict the chargeable/dischargeable energy 1504 and next operating state 1506 for the rest of the iterations in the time period.

The initial voltage of the subsystem for the first iteration of the time period may be determined using a voltage imbalance of the subsystem for the first iteration according to the equation:

$$V_t = CV\mathrm{min}_t/(1 - \alpha * \varepsilon)$$

where $CV\mathrm{min}_t$ is a minimum cell voltage of the battery cells of the subsystem for the first iteration, $\varepsilon$ is the voltage imbalance of the subsystem for the first iteration, and $\alpha$ is a scaling factor. The voltage imbalance is a function (i.e., a difference) of the minimum cell voltage of the battery cells of the subsystem for the first iteration and the maximum cell voltage of the battery cells of the subsystem for the first iteration. The minimum cell voltage and the maximum cell voltage may be determined (i.e., measured) using one or more voltage sensors (which may be integrated with a BMS). The initial charge rate of the subsystem for the first iteration of the time period may be determined according to the equation:

$$\text{Charge Rate} = (\text{Rated Power}/\text{Rated Energy Capacity}).$$

The initial maximum temperature for the first iteration of the time period may be determined (i.e., measured) using one or more temperature sensors (which may be integrated with a BMS).

The energy prediction sub-model 1501 and the state prediction sub-model 1502 may be executed until a last iteration of the iterative process is executed (in other words, the last iteration of the dynamic time period), where the decision may be determined at the decision point 1505. In some cases, the energy prediction sub-model 1501 and the state prediction sub-model 1502 may be executed until a maximum operating voltage (i.e., voltage limit) is output by the state prediction sub-model 1502, which may be determined at the decision point 1505. The maximum operating voltage may depend on the cell type and may be, for example, between about 1 V and about 10 V. In some cases, the maximum operating voltage may be between about 2.5 V and 4 V (for example, about 3.2 V). In some cases, the dynamic time period may be determined by the time required to charge or discharge the subsystem of the BESS from a first iteration of the iterative process to a last iteration of the iterative process, where the last iteration of the iterative process is the iteration in which the voltage of the subsystem output by the state prediction sub-model 1502 reaches the maximum operating.

The total chargeable/dischargeable energy 1507 of the subsystem of the BESS over the dynamic time period may be determined by summing the chargeable/dischargeable energy 1504 outputted by the energy prediction sub-model 1501 for each iteration. For a BESS site, the chargeable/dischargeable energy of the entire BESS site over the dynamic time period may be determined by summing the total dischargeable energies 1507 determined for each power block (group of battery racks).

In some cases, a battery type (i.e., chemistry) of the battery cells of the BESS subsystem may be one or more of the following: lithium ion, lithium nickel manganese cobalt (NMC), lithium iron phosphate (LFP), lithium sulfur (Li—S), solid state, nickel cadmium, nickel metal hydride (NiMH), zinc-air, iron-air, vanadium redox flow, sodium ion (e.g., sodium sulfur (NaS), sodium nickel chloride), potassium ion, aluminum ion, lead-acid, silicon anode, or combinations thereof, although the present disclosure is not limited thereto. Other battery types may include lithium titanate (LTO), lithium-air, magnesium-ion, calcium-ion, organic radical batteries, flow batteries such as zinc-bromine or iron-chromium, sodium-air, lithium-organic, and solid polymer electrolyte batteries. In some aspects, emerging technologies like graphene-based batteries, glass batteries, or sand batteries may also be utilized in BESS subsystems.

The architecture of the neural network model may be one or more of the following: multilayer perceptron (MLP), recurrent neural network (RNN), long short-term memory network, gated recurrent units (GRU), convolutional neural network (CNN), transformer network, deep belief network (DBN), radial basis function network (RBFN), echo state network (ESN), Hopfield network, Boltzmann machine, restricted Boltzmann machine (RBM), deep autoencoder, variational autoencoder (VAE), generative adversarial network (GAN), or a combination thereof, although the present disclosure is not limited thereto. In some cases, the architecture of the model is not a neural network but rather a tree-based model such as decision tree, random forest, gradient boosting machines (GBM), or a combination thereof, although the present disclosure is not limited thereto.

A MLP model may consist of multiple layers, including an input layer, one or more hidden layers, and an output layer. Each layer may be fully connected, meaning each neuron in one layer is connected to every neuron in the subsequent layer through weighted connections. The network may operate by processing input data through these layers, applying activation functions at each neuron to introduce non-linearity, and generating an output at the final layer. The weights of the connections may be adjusted during training through a process known as backpropagation, which minimizes the difference between the predicted output and the actual target. The MLP model is capable of performing complex tasks, such as classification or regression, by learning to map inputs to outputs based on the provided training data. In some aspects, the MLP model may incorporate additional techniques like dropout or batch normalization to improve generalization and training stability. The architecture of an MLP may be customized with varying numbers and sizes of hidden layers to suit different problem complexities. In some cases, MLP models may be combined with other neural network types in ensemble methods to further enhance predictive performance.

An RNN model may process sequences of data by maintaining connections between neurons across different time steps, enabling the network to retain information from previous inputs. This processing may be achieved through the use of recurrent connections, where the output from one time step is fed back into the network as input for the next time step, allowing the network to capture temporal dependencies in the data. The network may be trained using backpropagation through time (BPTT), which adjusts the weights to minimize the error between the predicted and actual outputs across the entire sequence. In some aspects, RNN models may incorporate gating mechanisms to better handle long-term dependencies. These gating mechanisms may allow the network to selectively update, forget, or output information at each time step. Additionally, RNN models may be stacked in multiple layers to create deep RNN architectures, potentially increasing their capacity to model complex temporal patterns. In some cases, attention mechanisms may be integrated into RNN models to allow the network to focus on different parts of the input sequence when making predictions, which may be particularly useful for tasks involving long sequences or where certain parts of the input are more relevant than others.

An LSTM network model is a type of RNN model that addresses the limitations of traditional RNN models in capturing long-range dependencies in sequential data. An LSTM network model may incorporate a unique cell structure that includes memory cells and gating mechanisms-namely, input, output, and forget gates. These gates regulate the flow of information, allowing the network to selectively retain or forget data over time, enabling it to maintain important information across longer sequences and avoid issues like vanishing or exploding gradients. LSTM networks may be particularly effective for tasks involving time series data or natural language processing. In some cases, LSTM models can be stacked or combined with other neural network architectures to create more complex and powerful models for specific applications.

A GRU model is similar to LSTM models but may have a simpler architecture, and may be less computationally demanding while still being effective for sequential data prediction. A GRU model may process sequential data by incorporating gating mechanisms that regulate the flow of information through the network. The GRU structure features two primary gates: an update gate, which determines the amount of past information to retain, and a reset gate, which controls the influence of new input data. These gates allow the GRU to maintain or modify its internal state dynamically, enabling the network to effectively capture temporal dependencies without the complexity of separate input and forget gates found in other architectures. In some aspects, GRU models may be particularly well-suited for tasks involving shorter sequences or where computational efficiency is a priority. Additionally, GRU models may be easier to train and may converge faster than LSTM models in certain applications, making them a popular choice for various sequence modeling tasks in natural language processing and time series analysis.

Figure 9:
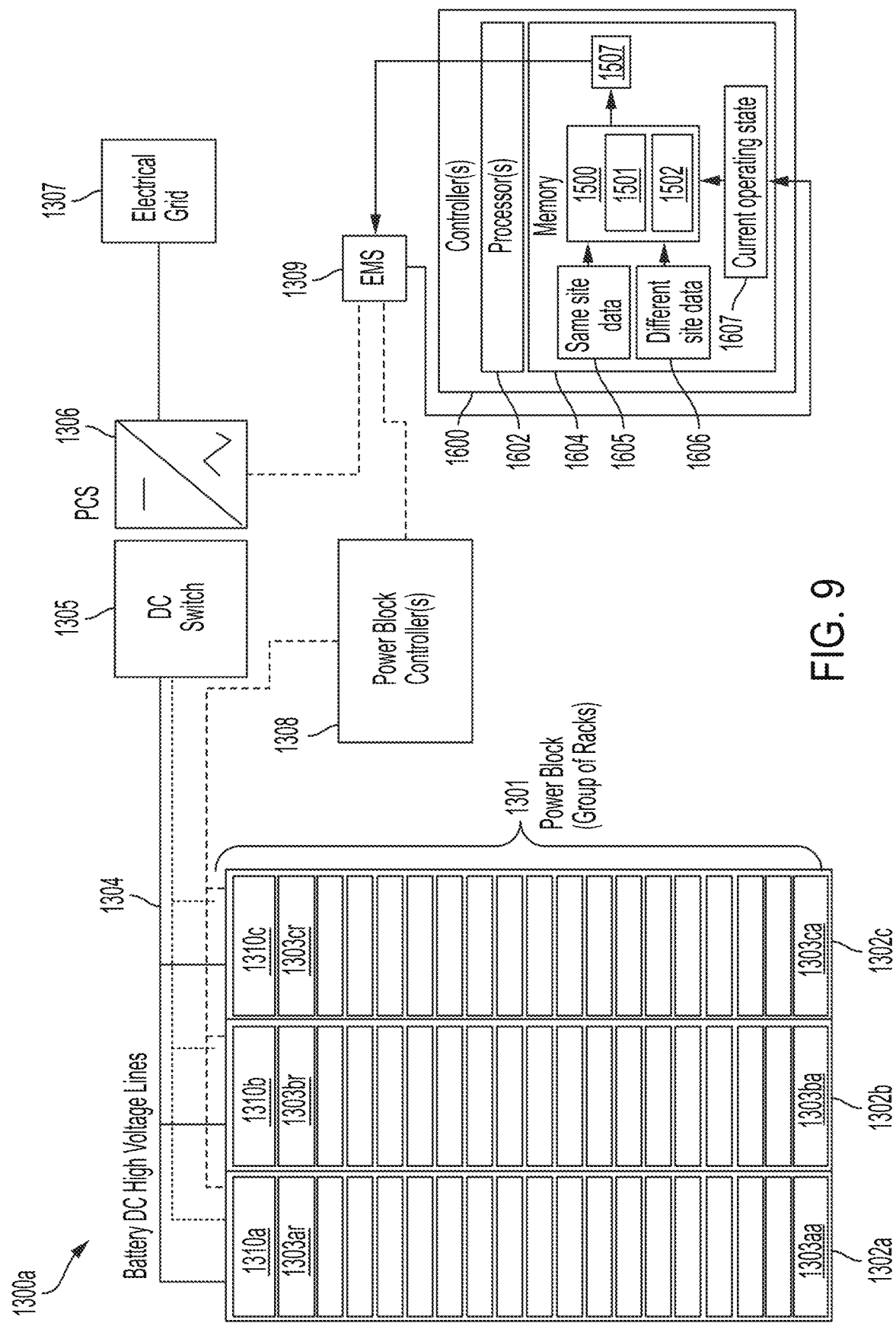
FIG. 9 is a schematic diagram illustrating a BESS subsystem comprising a power block including a controller implementing the model of FIGS. 6A and 6B according to an aspect of the present disclosure.

FIG. 9 is a schematic diagram illustrating the BESS subsystem 1300a comprising the power block 1301 including a controller 1600 implementing the neural network model described with respect to FIGS. 8A and 8B, according to an aspect of the present disclosure.

The controller 1600 may include one or more processors 1602 (i.e., processing modules) configured to execute program instructions maintained on a memory 1604 (i.e., memory module(s)). In this regard, the one or more processors 1602 of controller 1600 may execute any of the various methods, processes, steps, or algorithms described throughout the present disclosure, for example, the implementation of the neural network model including the inputting of the features 1503 into the energy prediction sub-model 1501 and the state prediction sub-model 1502, the determination of the chargeable/dischargeable energy 1504 for each iteration of the dynamic time period, the output of the operating state 1506 for the next iteration by the state prediction sub-model 1502, the determination of whether to end the execution of the sub-models 1501 and 1502 at the decision point 1505, and the determination of the total chargeable/dischargeable energy 1507.

Further, the controller 1600 may be configured to receive data including, but not limited to historical data of the operating state of a BESS subsystem (from the power block controller 1308 and/or the EMS1 309). The sub-models 1501 and 1502 may be trained using historical data of a BESS subsystem having a particular cell type (i.e., chemistries such as Li NMC or LFP). The historical data may comprise voltage, charge rate and maximum cell temperature for the BESS subsystem over a period of time (for example, several months). The historical data may be measured using sensors (for example, voltage and temperature sensors). The sub-models 1501 and 1502 may be trained using historical data 1605 derived from the same BESS site for which the chargeable/dischargeable energy is to be determined. In some cases, the sub-models 1501 and 1502 may be trained using historical data 1606 derived from a different BESS site for which the chargeable/dischargeable energy is to be determined. In some cases, the sub-models 1501 and 1502 may be trained using a combination of historical data 1605 derived from the same BESS site and historical data 1606 derived from a different BESS site. In some cases, the controller 1600 may receive an initial operating state 1607 of the BESS subsystem 1300a, for example, initial minimum cell voltage, initial maximum cell voltage, initial cell voltage imbalance, initial operating voltage, initial charge rate, initial maximum temperature, although the present disclosure is not limited thereto. In some cases, the controller 1600 may provide the total chargeable/dischargeable energy 1507 data to the EMS 1309 and/or the power block controller 1308, which may then make decisions on when to discharge and how much energy to discharge.

The controller 1600 (i.e., computing device) may comprise a desktop computer, mainframe computer system, workstation, image computer, parallel processor, or any other computer system (e.g., networked computer). The one or more processors 1602 of the controller 1600 may include any processing element known in the art. In this sense, the one or more processors 1602 may include any microprocessor-type device configured to execute algorithms and/or instructions, for example, application specific integrated circuits (ASIC), field programmable gate array (FPGA), parallel processor, graphics processing unit (GPU), central processing unit (CPU), other chipsets, a logical circuit, and/or an electronic processor. It is further recognized that the term "processor" may be broadly defined to encompass any device having one or more processing elements, which execute program instructions from a non-transitory memory 1604. Further, the steps described throughout the present disclosure may be performed by a single controller 1600 or, alternatively, multiple controllers. For example, the power block controller 1308, EMS 1309, PCS 1306 and controller 1600 may be the same controller or multiple controllers. Additionally, the controller 1600 may include one or more controllers housed in a common housing or within multiple housings. In this way, any controller or combination of controllers may be separately packaged as a module suitable for integration into BESS subsystem 1300a.

The memory 1604 may include any storage medium known in the art suitable for storing program instructions executable by the associated one or more processors 1602. For example, the memory 1604 may include a non-transitory memory medium. By way of another example, the memory medium 1604 may include, but is not limited to, a read-only memory, a random access memory, a magnetic or optical memory device (e.g., disk), a magnetic tape, a solid state drive, etc. It is further noted that memory 1604 may be housed in a common controller housing with the processor(s) 1602. In some cases, the memory 1604 may be located remotely with respect to the physical location of the processors 1602 and controller 1600. For instance, the one or more processors 1602 of controller 1600 may access a remote memory (e.g., server or cloud), accessible through a network (e.g., internet, intranet and the like).

In the above, the present disclosure has been described in more detail through the drawings and aspects. However, the configurations described in the drawings or the aspects in the specification are merely aspects of the present disclosure and do not represent all the technical ideas of the present disclosure. Thus, it is to be understood that there may be various equivalents and variations in place of them at the time of filing the present application which are encompassed by the claims.

What is claimed is:

1. A system for determining a total chargeable/dischargeable energy of a subsystem of a battery energy storage system (BESS), the subsystem comprising battery cells, comprising:
   one or more controllers comprising one or more processing modules and one or more non-transitory memory storage modules storing computing instructions which when executed by the one or more processing modules is configured to:
   execute an iterative process over a dynamic time period, wherein the dynamic time period is divided into iterations, by using a neural network model comprising an energy prediction sub-model and a state prediction sub-model, wherein for each iteration of the iterations, the controller is configured to:
   (1) input into the energy prediction sub-model: a voltage of the subsystem for a current iteration of the iterations, a charge rate of the subsystem for the current iteration, and a maximum temperature of the subsystem for the current iteration;
   wherein the energy prediction sub-model is configured to output a chargeable/dischargeable energy of the subsystem for the current iteration; and
   (2) input into the state prediction sub-model: the voltage of the subsystem for the current iteration, the charge rate of the subsystem for the current iteration, the maximum temperature of the subsystem for the current iteration, and a charge rate difference for the current iteration;

wherein the charge rate difference for the current iteration is the charge rate of the subsystem for the current iteration minus the charge rate of the subsystem for a previous iteration of the iterations;

wherein the state prediction sub-model is configured to output a voltage of the subsystem for a next iteration of the iterations, the charge rate of the subsystem for the next iteration, the maximum temperature of the subsystem for the next iteration, and a charge rate difference for the next iteration;

(3) repeat steps (1) and (2) until a last iteration of the iterative process is executed; and (4) determine the total chargeable/dischargeable energy of the subsystem of the BESS over the dynamic time period by summing the chargeable/dischargeable energy outputted by the energy prediction sub-model for each iteration;

(5) manage a timing and an amount of energy for charging and discharging the BESS based at least partially on the determined total chargeable/dischargeable energy of the subsystem of the BESS.

2. The system of claim 1, wherein the voltage of the subsystem for a first iteration of the iterations is determined using a voltage imbalance of the subsystem for the first iteration according to an equation:

$$V_t = CV\min_t/(1 - \alpha * \varepsilon)$$

where $CV\min_t$ is a minimum cell voltage of the battery cells of the subsystem for the first iteration, $\varepsilon$ is the voltage imbalance of the subsystem for the first iteration, and $\alpha$ is a scaling factor, wherein the voltage imbalance is a function of the minimum cell voltage of the subsystem for the first iteration and a maximum cell voltage of the subsystem for the first iteration.

3. The system of claim 1, wherein the one or more controllers is configured to:

repeat steps (1) and (2) until the voltage of the subsystem for the next iteration of the iterative process outputted by the state prediction sub-model reaches a voltage limit.

4. The system of claim 3, wherein the one or more controllers is configured to:

after reaching the voltage limit, determine the total chargeable/dischargeable energy of the subsystem of the BESS over the dynamic time period by summing the chargeable/dischargeable energy outputted by the energy prediction sub-model for each iteration.

5. The system of claim 3, wherein the dynamic time period is determined by a time required to charge or discharge the subsystem of the BESS from a first iteration of the iterative process to a last iteration of the iterative process, wherein the last iteration of the iterative process is the iteration in which the voltage of the subsystem output by the state prediction sub-model reaches the voltage limit.

6. The system of claim 1, wherein the subsystem is selected from at least one of: a plurality of battery packs comprising the battery cells, or a plurality of battery racks comprising battery packs.

7. The system of claim 1, wherein a battery type of the battery cells of the subsystem is selected from the group comprising: lithium nickel manganese cobalt (NMC), lithium iron phosphate (LFP), lithium sulfur (Li—S), solid state, nickel cadmium, nickel metal hydride (NiMH), zinc-air, iron-air, vanadium redox flow, sodium ion, potassium ion, aluminum ion, lead-acid, silicon anode, or a combination thereof.

8. The system of claim 1, wherein the BESS is configured to store renewable electricity generated by solar power or wind power in order to reduce reliance on fossil fuel-based power generation and mitigate climate change effects.

9. A method for determining a total chargeable/dischargeable energy of a subsystem of a battery energy storage system (BESS), the subsystem comprising battery cells, comprising:

executing an iterative process over a dynamic time period, wherein the dynamic time period is divided into iterations, by using a neural network model comprising an energy prediction sub-model and a state prediction sub-model, wherein each iteration of the iterations comprises the following steps:

(1) inputting into the energy prediction sub-model: a voltage of the subsystem for a current iteration of the iterations, a charge rate of the subsystem for the current iteration, and a maximum temperature of the subsystem for the current iteration;

wherein the energy prediction sub-model outputs a chargeable/dischargeable energy of the subsystem for the current iteration; and (2) inputting into the state prediction sub-model: the voltage of the subsystem for the current iteration, the charge rate of the subsystem for the current iteration, the maximum temperature of the subsystem for the current iteration, and a charge rate difference for the current iteration;

wherein the charge rate difference for the current iteration is the charge rate of the subsystem for the current iteration minus the charge rate of the subsystem for a previous iteration of the iterations;

wherein the state prediction sub-model outputs a voltage of the subsystem for a next iteration of the iterations, the charge rate of the subsystem for the next iteration, the maximum temperature of the subsystem for the next iteration, and a charge rate difference for the next iteration;

(3) repeating steps (1) and (2) until a last iteration of the iterative process is executed;

(4) determining the total chargeable/dischargeable energy of the subsystem of the BESS over the dynamic time period by summing the chargeable/dischargeable energy outputted by the energy prediction sub-model for each iteration; and (5) managing a timing and an amount of energy for charging and discharging the BESS based at least partially on the determined total chargeable/dischargeable energy of the subsystem of the BESS.

10. The method of claim 9, wherein the voltage of the subsystem for a first iteration of the iterations is determined using a voltage imbalance of the subsystem for the first iteration according to an equation:

$$V_t = CV\min_t/(1 - \alpha * \varepsilon)$$

where $CVmin_t$ is a minimum cell voltage of the battery cells of the subsystem for the first iteration, ε is the voltage imbalance of the subsystem for the first iteration, and α is a scaling factor,
wherein the voltage imbalance is a function of the minimum cell voltage of the subsystem for the first iteration and a maximum cell voltage of the subsystem for the first iteration.

11. The system of claim 1, wherein an architecture of the neural network model is selected from the group consisting of: multilayer perceptron (MLP), recurrent neural network (RNN), long short term memory network, gated recurrent units (GRU), or a combination thereof.

12. The method of claim 9, further comprising:
repeating steps (1) and (2) until the voltage of the subsystem for a next iteration of the iterative process outputted by the state prediction sub-model reaches a voltage limit.

13. The method of claim 12, further comprising:
after reaching the voltage limit, determining the total chargeable/dischargeable energy of the subsystem of the BESS over the dynamic time period by summing the chargeable/dischargeable energy outputted by the energy prediction sub-model for each iteration.

14. The method of claim 12, wherein the dynamic time period is determined by a time required to charge or discharge the subsystem of the BESS from a first iteration of the iterative process to a last iteration of the iterative process, wherein the last iteration of the iterative process is the iteration in which the voltage of the subsystem output by the state prediction sub-model reaches the voltage limit.

15. The method of claim 9, wherein the subsystem is selected from at least one of: a plurality of battery packs comprising the battery cells, or a plurality of battery racks comprising battery packs.

16. The method of claim 9, wherein a battery type of the battery cells of the subsystem is selected from the group consisting of: lithium nickel manganese cobalt (NMC), lithium iron phosphate (LFP), lithium sulfur (Li—S), solid state, nickel cadmium, nickel metal hydride (NiMH), zinc-air, iron-air, vanadium redox flow, sodium ion, potassium ion, aluminum ion, lead-acid, silicon anode, or a combination thereof.

17. The method of claim 9, wherein the BESS is configured to store renewable electricity generated by solar power or wind power in order to reduce reliance on fossil fuel-based power generation and mitigate climate change effects.

18. The method of claim 9, wherein an architecture of the neural network model is selected from the group consisting of: multilayer perceptron (MLP), recurrent neural network (RNN), long short term memory network, gated recurrent units (GRU), or a combination thereof.

* * * * *